United States Patent
Farsad et al.

(10) Patent No.: US 10,809,124 B2
(45) Date of Patent: Oct. 20, 2020

(54) SPECTROMETERS AND INSTRUMENTS INCLUDING THEM

(71) Applicant: PerkinElmer Heath Sciences, Inc., Waltham, MA (US)

(72) Inventors: Mahsa Farsad, New Haven, CT (US); David Aikens, New Haven, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 0 days.

(21) Appl. No.: 16/100,587

(22) Filed: Aug. 10, 2018

(65) Prior Publication Data

US 2019/0339123 A1 Nov. 7, 2019

Related U.S. Application Data

(60) Provisional application No. 62/667,973, filed on May 7, 2018.

(51) Int. Cl.
*G01J 3/02* (2006.01)
*G01J 3/443* (2006.01)
*G01N 21/73* (2006.01)
*G01J 3/18* (2006.01)

(52) U.S. Cl.
CPC ............. *G01J 3/021* (2013.01); *G01J 3/0208* (2013.01); *G01J 3/1809* (2013.01); *G01J 3/443* (2013.01); *G01N 21/73* (2013.01); *G01N 2201/0637* (2013.01)

(58) Field of Classification Search
CPC ........ G01J 3/0208; G01J 3/021; G01J 3/1809; G01J 3/443; G01N 21/73; G01N 2201/0637
See application file for complete search history.

(56) References Cited

U.S. PATENT DOCUMENTS

| | | | |
|---|---|---|---|
| 4,820,048 A | 4/1989 | Barnard | |
| 4,995,721 A | 2/1991 | Krupa et al. | |
| 5,483,337 A | 1/1996 | Barnard et al. | |
| 5,640,283 A * | 6/1997 | Warren | G02B 17/0642 359/366 |
| 9,354,116 B1 * | 5/2016 | Cook | G01J 3/2823 |
| 2004/0051857 A1 * | 3/2004 | Hudyma | G02B 17/0652 355/67 |
| 2009/0316146 A1 * | 12/2009 | Beardsley | G01J 3/02 356/303 |
| 2011/0263033 A1 * | 10/2011 | Basile | G01N 21/631 436/93 |

(Continued)

FOREIGN PATENT DOCUMENTS

DE 102016124980 A1 8/2017

OTHER PUBLICATIONS

Jul. 5, 2019—(PCT) International Search Report and Written Opinion—App PCT/US2019/030113.

*Primary Examiner* — Hina F Ayub
(74) *Attorney, Agent, or Firm* — Banner & Witcoff, Ltd.

(57) ABSTRACT

Certain configurations are described herein of an optical spectrometer and instruments including an optical spectrometer. In some instances, the optical spectrometer is configured to spatially separate provided wavelengths of light to permit detection or imaging of each provided wavelength of light. Improved sensitivities and detection limits may be achieved using the optical spectrometers described herein.

27 Claims, 6 Drawing Sheets

(56) References Cited

U.S. PATENT DOCUMENTS

| | | | |
|---|---|---|---|
| 2011/0273160 A1* | 11/2011 | Scuka | G05F 1/12 |
| | | | 323/312 |
| 2011/0273260 A1* | 11/2011 | Morrisroe | G01N 21/3103 |
| | | | 336/222 |
| 2014/0321714 A1* | 10/2014 | Masten | G06K 9/00657 |
| | | | 382/110 |
| 2017/0268927 A1 | 9/2017 | Beardsley et al. | |
| 2018/0031424 A1* | 2/2018 | Hill | G01B 11/272 |

* cited by examiner

SPECTROMETERS AND INSTRUMENTS INCLUDING THEM

RELATED APPLICATION

This application claims priority to U.S. Provisional Patent Application No. 62/667,973 filed on May 7, 2018, whose contents are expressly incorporated herein by reference in its entirety.

TECHNOLOGICAL FIELD

Certain configurations are described herein of a spectrometer than may be used to select one or more wavelengths of light. In some examples, the spectrometer may provide light separation over a wide wavelength range with better detection limits.

BACKGROUND

Spectrometers may be used to separate various wavelengths of light into individual wavelengths. Many spectrometers include refractive and/or reflective components. Spectral overlap is commonly observed, which reduces accuracy, lowers detection limits and can provide poor imaging resolution.

SUMMARY

Certain aspects, configurations, embodiments, and examples of optical spectrometers and instruments and systems including them are described.

One or more aspects relate to an Echelle spectrometer with fast collimator and a multi-mirror aspheric imager. As described herein, light from a sample may be obtained via an inductively coupled plasma torch fluidically coupled to the sample introduction device. Alternatively, light may be received from other sources.

Additional aspects, configurations, embodiments and examples are described in more detail below.

BRIEF DESCRIPTION OF THE SEVERAL VIEWS OF THE DRAWINGS

Certain specific configurations of a spectrometer, and components thereof, are described below with reference to the accompanying figures in which.

It will be recognized by the skilled person in the art, given the benefit of this disclosure, that the exact arrangement, sizes and positioning of the components in the figures is not necessarily to scale or required. The particular sizes and angles of one component relative to another component may vary to provide a desired response or output from the component or the optical spectrometer comprising the component.

DETAILED DESCRIPTION

Certain configurations of a spectrometer comprising a plurality of independent optical elements optically coupled to each other are described below. While the exact type and arrangement of the optical elements may vary, depending on the desired optical output from the spectrometer, the spectrometer may comprise two, three, four, five or more independent optical elements positioned within a housing and optically coupled to each other.

Certain illustrations below refer to the terms "upstream" and "downstream" for positional reference. A first optical element that is upstream of a second optical element is optically closer to an entrance slit than the second component. For example, incident light would arrive at the first component before arriving at the second component when the first component is positioned upstream of the second component. A second optical element that is downstream of a first optical element is optically further away from an entrance slit than the first component. For example, incident light would arrive at the first component before arriving at the second component when the second component is positioned downstream of the first component. These terms are not intended to limit the exact arrangement of the optical elements to any one described illustration but are used to enhance the clarity of the description.

In one aspect, an inductively coupled plasma optical emission instrument is disclosed. In certain examples, the instrument comprises a sample introduction device. In other examples, the instrument comprises a torch fluidically coupled to the sample introduction device. In some instances, the instrument comprises an induction device configured to provide radio frequency energy into the torch to sustain an inductively coupled plasma in the torch. The instrument may comprise an optical spectrometer configured to receive and select wavelengths of light over an entire wavelength range of about 165 nm to about 950 nm. For examples, the optical spectrometer comprises an entrance slit optically coupled to the inductively coupled plasma in the torch and configured to receive light emission from analyte species in the inductively coupled plasma in the torch. The optical spectrometer comprises a collimator optically coupled to the entrance slit. The optical spectrometer comprises an Echelle grating optically coupled to the collimator and configured to receive collimated light from the collimator and disperse the received collimated light. The optical spectrometer comprises a double-pass optical disperser optically coupled to the Echelle grating and configured to receive the dispersed light from the Echelle grating and provide cross-dispersed light. The optical spectrometer comprises a reflective triplet telescope optically coupled to the double-pass optical disperser and configured to receive the cross-dispersed light from the double-pass optical disperser, wherein the reflective triplet telescope is configured to provide one or more wavelengths of light in the received light emission from the analyte species, wherein each wavelength of light provided by the reflective triplet telescope is spatially separated from other provided wavelengths of light to permit detection of each provided wavelength of light. The spectrometer may also comprise a detector optically coupled to the optical spectrometer and configured to receive the spatially separated one or more provided wavelengths of light.

In some examples, the double-pass optical disperser of the optical spectrometer comprises a double-pass reflective prism. In other examples, the reflective triplet telescope comprises a primary mirror optically coupled to the double-pass optical disperser, a secondary mirror optically coupled to the primary mirror, and a tertiary mirror optically coupled to the secondary mirror. In some configurations, each of the primary mirror, the secondary mirror and the tertiary mirror comprise rotationally symmetric, aspherical surfaces. In some configurations, the primary mirror comprises a concave aspherical hyperboloid surface, the secondary mirror comprises a convex aspherical ellipsoid surface and the tertiary mirror comprises a concave aspherical hyperboloid surface.

In some examples, the collimator comprises an off-axis parabola. In certain instances, the f # of the collimator is 3 and the off-axis angle of the collimator is 14 degrees. In other instances, the focal length of the collimator is about 255 mm. In some examples, the rotationally symmetric, aspherical surfaces are $12^{th}$ order rotationally symmetric, aspherical surfaces. In certain embodiments, the Echelle grating comprises a blaze angle of 62 degrees and a groove density of 79 lines per mm.

In certain configurations, the spectral resolution of the optical spectrometer is about 0.006 nm at 220 nm.

In other configurations, the double-pass optical disperser of the optical spectrometer comprises a grism, a double-pass reflective grism, a double-pass reflective prism, a refractive prism, a reflective grating or a refractive grating.

In some instances, the double-pass optical disperser of the optical spectrometer comprises a double-pass reflective prism, wherein the reflective triplet telescope comprises a primary mirror optically coupled to the double-pass optical disperser, a secondary mirror optically coupled to the primary mirror, and a tertiary mirror optically coupled to the secondary mirror, wherein each of the primary mirror, secondary mirror and tertiary mirror comprises a rotationally symmetric, aspherical surfaces of the $12^{th}$ order.

In other instances, wherein the primary mirror comprises a concave aspherical hyperboloid surface that is optically coupled to the double-pass optical disperser, the secondary mirror comprises a convex aspherical ellipsoid surface that is optically coupled to the concave aspherical hyperboloid surface of the primary mirror, and the tertiary mirror comprises a concave aspherical hyperboloid surface that is optically coupled to the convex aspherical ellipsoid surface of the secondary mirror.

In some examples, the detector comprises a charged coupled device camera or a complementary metal-oxide-semiconductor detector.

In other examples, the induction device is configured as an induction coil or a plate electrode.

In some instances, the spectrometer comprises a radio frequency generator electrically coupled to the induction device.

In certain configurations, one or two of the primary mirror, the secondary mirror and the tertiary mirror comprises a freeform, rotationally nonsymmetric surface shape.

In another aspect, an optical spectrometer configured to receive and select wavelengths of light within a wavelength range of about 165 nm to about 950 nm is described. In some configurations, the optical spectrometer comprises an entrance slit configured to receive light, a collimator optically coupled to the entrance slit, an Echelle grating optically coupled to the collimator and configured to receive collimated light from the collimator and disperse the received collimated light, a double-pass optical disperser optically coupled to the Echelle grating and configured to receive the dispersed light from the Echelle grating and provide cross-dispersed light, and a reflective triplet telescope optically coupled to the double-pass optical disperser and configured to receive the cross-dispersed light from the double-pass optical disperser. For example, the reflective triplet telescope may be configured to provide one or more wavelengths of light in the received light, wherein each wavelength of light provided by the reflective triplet telescope is spatially separated from other provided wavelengths of light to permit detection of each provided wavelength of light.

In certain examples, the double-pass optical disperser of the optical spectrometer comprises a double-pass reflective prism. In other examples, the reflective triplet telescope comprises a primary mirror optically coupled to the double-pass optical disperser, a secondary mirror optically coupled to the primary mirror, and a tertiary mirror optically coupled to the secondary mirror. In some instances, each of the primary mirror, secondary mirror and tertiary mirror comprises a rotationally symmetric, aspherical surface. In certain configurations, the primary mirror comprises a concave aspherical hyperboloid surface, the secondary mirror comprises a convex aspherical ellipsoid surface and the tertiary mirror comprises a concave aspherical hyperboloid surface. In other examples, the collimator comprises an off-axis parabola. In some instances, the f # of the collimator is 3 and the off-axis angle of the collimator is 14 degrees. In other examples, the focal length of the collimator is about 255 mm. In some embodiments, the rotationally symmetric, aspherical surfaces are $12^{th}$ order rotationally symmetric, aspherical surfaces. In some examples, the Echelle grating comprises a blaze angle of 62 degrees and a groove density of 79 lines per mm.

In certain embodiments, the spectral resolution of the optical spectrometer is about 0.006 nm at 220 nm.

In other embodiments, the double-pass optical disperser of the optical spectrometer comprises a grism, a double-pass reflective grism, a double-pass reflective prism, a refractive prism, a reflective grating or a refractive grating.

In some examples, the double-pass optical disperser of the optical spectrometer comprises a double-pass reflective prism, wherein the reflective triplet telescope comprises a primary mirror optically coupled to the double-pass optical disperser, a secondary mirror optically coupled to the primary mirror, and a tertiary mirror optically coupled to the secondary mirror, wherein each of the primary mirror, secondary mirror and tertiary mirror comprises a rotationally symmetric, aspherical surface of the $12^{th}$ order.

In other examples, the primary mirror comprises a concave aspherical hyperboloid surface that is optically coupled to the double-pass optical disperser, the secondary mirror comprises a convex aspherical ellipsoid surface that is optically coupled to the concave aspherical hyperboloid surface of the primary mirror, and the tertiary mirror comprises a concave aspherical hyperboloid surface that is optically coupled to the convex aspherical ellipsoid surface of the secondary mirror.

In some examples, one of the primary mirror, the secondary mirror and the tertiary mirror comprises a freeform, rotationally nonsymmetric surface shape. In other examples, one of the primary mirror, the secondary mirror and the tertiary mirror comprises an aspherical surface shape. In certain examples, the tertiary mirror comprises the freeform, rotationally nonsymmetric surface shape.

In other instances, two of the primary mirror, the secondary mirror and the tertiary mirror comprise a freeform, rotationally nonsymmetric surface shape, and one of the primary mirror, the secondary mirror and the tertiary mirror comprises an aspherical surface shape.

In another aspect, an inductively coupled plasma optical emission instrument comprises a sample introduction device, a torch fluidically coupled to the sample introduction device, an induction device configured to provide radio frequency energy into the torch to sustain an inductively coupled plasma in the torch and an optical spectrometer configured to receive and select wavelengths of light over an entire wavelength range of about 165 nm to about 950 nm. In some configurations, the optical spectrometer comprises an entrance slit optically coupled to the inductively coupled plasma in the torch and configured to receive light emission from analyte species in the inductively coupled plasma in the torch. In other configurations, the optical spectrometer comprises a collimator optically coupled to the entrance slit. In some embodiments, the optical spectrometer comprises an Echelle grating optically coupled to the collimator and configured to receive collimated light from the collimator and disperse the received collimated light. In additional instances, the optical spectrometer comprises an optical disperser optically coupled to the Echelle grating and configured to receive the dispersed light from the Echelle grating and provide cross-dispersed light. In certain examples, the optical spectrometer comprises a reflective triplet telescope optically coupled to the optical disperser and configured to receive the cross-dispersed light from the optical disperser. For example, the reflective triplet telescope comprises a plurality of independent and separate rotationally symmetric, aspherical surfaces. The reflective triplet telescope may be configured to provide one or more wavelengths of light in the received light emission from the analyte species. Each wavelength of light provided by the reflective triplet telescope may be spatially separated from other provided wavelengths of light to permit detection of each provided wavelength of light. The spectrometer may also comprise a detector optically coupled to the optical spectrometer and configured to receive the spatially separated one or more provided wavelengths of light.

In certain examples, the reflective triplet telescope comprises a primary mirror optically coupled to the double-pass optical disperser, a secondary mirror optically coupled to the primary mirror, and a tertiary mirror optically coupled to the secondary mirror. For example, each of the primary mirror, the secondary mirror and the tertiary mirror comprise rotationally symmetric, aspherical surfaces. In some examples, the primary mirror comprises a concave aspherical hyperboloid surface, the secondary mirror comprises a convex aspherical ellipsoid surface and the tertiary mirror comprises a concave aspherical hyperboloid surface. In other examples, the collimator comprises an off-axis parabola. In certain instances, the f # of the collimator is 3 and the off-axis angle of the collimator is 14 degrees. In some embodiments, the focal length of the collimator is about 255 mm.

In some examples, the plurality of independent and separate rotationally symmetric, aspherical surfaces are each $12^{th}$ order rotationally symmetric, aspherical surfaces.

In certain configurations, one or two of the primary mirror, the secondary mirror and the tertiary mirror comprises a freeform, rotationally nonsymmetric surface shape and one of the primary mirror, the secondary mirror and the tertiary mirror comprises a shape other than a freeform, rotationally nonsymmetric surface shape. In some examples, the tertiary mirror comprises the freeform, rotationally nonsymmetric surface shape.

In an additional aspect, an optical spectrometer configured to receive and select wavelengths over an entire wavelength range of about 165 nm to about 950 nm is described. In some configurations, the optical spectrometer comprises an entrance slit configured to receive light, a collimator optically coupled to the entrance slit, an Echelle grating optically coupled to the collimator and configured to receive collimated light from the collimator and disperse the received collimated light, an optical disperser optically coupled to the Echelle grating and configured to receive the dispersed light from the Echelle grating and provide cross-dispersed light, and a reflective triplet telescope optically coupled to the optical disperser and configured to receive the cross-dispersed light from the optical disperser. In some instances, the reflective triplet telescope comprises a plurality of independent and separate rotationally symmetric, aspherical surfaces. The reflective triplet telescope may be configured to provide one or more wavelengths of light in the received light. Each wavelength of light provided by the reflective triplet telescope may be spatially separated from other provided wavelengths of light to permit detection of each provided wavelength of light.

In some examples, the reflective triplet telescope comprises a primary mirror optically coupled to the double-pass optical disperser, a secondary mirror optically coupled to the primary mirror, and a tertiary mirror optically coupled to the secondary mirror. In other examples, each of the primary mirror, the secondary mirror and the tertiary mirror comprise rotationally symmetric, aspherical surfaces. In some examples, the primary mirror comprises a concave aspherical hyperboloid surface, the secondary mirror comprises a convex aspherical ellipsoid surface and the tertiary mirror comprises a concave aspherical hyperboloid surface. In other examples, the collimator comprises an off-axis parabola. In some examples, the f # of the collimator is 3 and the off-axis angle of the collimator is 14 degrees. In other embodiments, the focal length of the collimator is about 255 mm.

In certain instances, the plurality of independent and separate rotationally symmetric, aspherical surfaces are each $12^{th}$ order rotationally symmetric, aspherical surfaces.

In some examples, one or two of the primary mirror, the secondary mirror and the tertiary mirror comprises a freeform, rotationally nonsymmetric surface shape and one of the primary mirror, the secondary mirror and the tertiary mirror comprises a shape other than a freeform, rotationally nonsymmetric surface shape. In other examples, the tertiary mirror comprises the freeform, rotationally nonsymmetric surface shape.

In another aspect, an optical spectrometer configured to receive optical emissions comprising a plurality of light wavelengths produced from optical emissions of a plurality of analyte species in an inductively coupled plasma and provide selected wavelengths of light to a detector is described. In some configurations, the optical spectrometer comprises an entrance slit configured to receive the optical emissions comprising the plurality of light wavelengths, first optic means optically coupled to the entrance slit and configured to disperse the received optical emissions comprising the plurality of light wavelengths, double-pass optical dispersing means optically coupled to the first optic means and configured to receive the dispersed optical emissions from the first optic means, the double-pass optical dispersing means configured to cross-disperse the dispersed optical emissions received from the first optic means, and telescope means optically coupled to the second optic means, the telescope means comprising a plurality of reflective optical elements optically coupled to each other and together configured to provide one or more wavelengths of light in the received plurality of light wavelengths, wherein each wavelength of light provided by the telescope means is spatially separated from other provided wavelengths of light to permit detection of each provided wavelength of light.

In certain examples, the telescope means comprises a primary mirror optically coupled to the double-pass optical disperser, a secondary mirror optically coupled to the primary mirror, and a tertiary mirror optically coupled to the secondary mirror. In other examples, each of the primary mirror, the secondary mirror and the tertiary mirror comprise rotationally symmetric, aspherical surfaces. In some examples, the primary mirror comprises a concave aspherical hyperboloid surface, the secondary mirror comprises a convex aspherical ellipsoid surface and the tertiary mirror comprises a concave aspherical hyperboloid surface.

In certain examples, the first optic means comprises an off-axis parabola collimator. In some embodiments, the f # of the collimator is 3 and the off-axis angle of the collimator is 14 degrees. In other examples, the focal length of the collimator is about 255 mm.

In some examples, each of the plurality of reflective optical elements comprises a rotationally symmetric, aspherical surface. In some instances, each of the rotationally symmetric, aspherical surface are $12^{th}$ order rotationally symmetric, aspherical surfaces.

In other configurations, one or two of the primary mirror, the secondary mirror and the tertiary mirror comprises a freeform, rotationally nonsymmetric surface shape and one of the primary mirror, the secondary mirror and the tertiary mirror comprises a shape other than a freeform, rotationally nonsymmetric surface shape. In some embodiments, the tertiary mirror comprises the freeform, rotationally nonsymmetric surface shape.

In another aspect, a method of detecting simultaneous optical emissions of analyte species in an ionization device is provided. The method may comprise spatially separating each emitted wavelength in the simultaneous optical emissions to permit detection of each analyte species over wavelength range of about 165 nm to about 950 nm.

In certain examples, the method comprises providing the simultaneous optical emissions to an optical spectrometer comprising a collimator, an Echelle grating optically coupled to the collimator and configured to receive collimated light from the collimator and disperse the received collimated light, an optical disperser optically coupled to the Echelle grating and configured to receive the dispersed light from the Echelle grating and provide cross-dispersed light, and a reflective triplet telescope optically coupled to the optical disperser and configured to receive the cross-dispersed light from the optical disperser, wherein the reflective triplet telescope comprises a plurality of independent and separate rotationally symmetric, aspherical surfaces, wherein the reflective triplet telescope is configured to provide one or more wavelengths of light in the provided optical emissions from the analyte species, wherein each wavelength of light provided by the reflective triplet telescope is spatially separated from other provided wavelengths of light to permit detection of each provided wavelength of light.

In some examples, the method comprises configuring the reflective triplet telescope to comprise a primary mirror optically coupled to the double-pass optical disperser, a secondary mirror optically coupled to the primary mirror, and a tertiary mirror optically coupled to the secondary mirror. In other instances, the method comprises configuring each of the primary mirror, the secondary mirror and the tertiary mirror comprise rotationally symmetric, aspherical surfaces. In some examples, the method comprises configuring the primary mirror to comprise a concave aspherical hyperboloid surface, configuring the secondary mirror to comprise a convex aspherical ellipsoid surface, and configuring the tertiary mirror to comprise a concave aspherical hyperboloid surface. In certain examples, the spectral resolution of the optical spectrometer is about 0.006 nm at 220 nm. In other examples, the method comprises configuring the rotationally symmetric, aspherical surfaces to each be $12^{th}$ order rotationally symmetric, aspherical surfaces.

In some configurations, the method comprises configuring one of the primary mirror, the secondary mirror and the tertiary mirror to comprise a freeform, rotationally nonsymmetric surface shape. In other configurations, the method comprises configuring one of the primary mirror, the secondary mirror and the tertiary mirror to comprise an aspherical surface shape. In some examples, the method comprises configuring the tertiary mirror to comprise the freeform, rotationally nonsymmetric surface shape.

In certain examples, an optical spectrometer configured to receive a plurality of wavelengths of light in a wavelength range of about 165 nm to about 950 nm and spatially separate each wavelength of light to provide at least 0.01 nm spectral resolution is described. In some configurations, the optical spectrometer comprises a plurality of separate optical elements. For example, a first optical element may be configured to receive the plurality of wavelengths of light and disperse the received plurality of wavelengths of light. A second optical element may be optically coupled to the first optical element and may be configured to receive the dispersed plurality of wavelengths of light from the first optical element and cross-disperse the dispersed plurality of wavelengths of light. A third optical element optically may be coupled to the second optical element. The third optical element comprises at least one rotationally symmetric, aspherical surface. The third optical element may be configured to receive the cross-dispersed plurality of wavelengths of light from the second optical element and spatially separate the received, cross-dispersed plurality of wavelengths of light to permit detection of each wavelength of light in the plurality of wavelengths of light.

Figure 1:
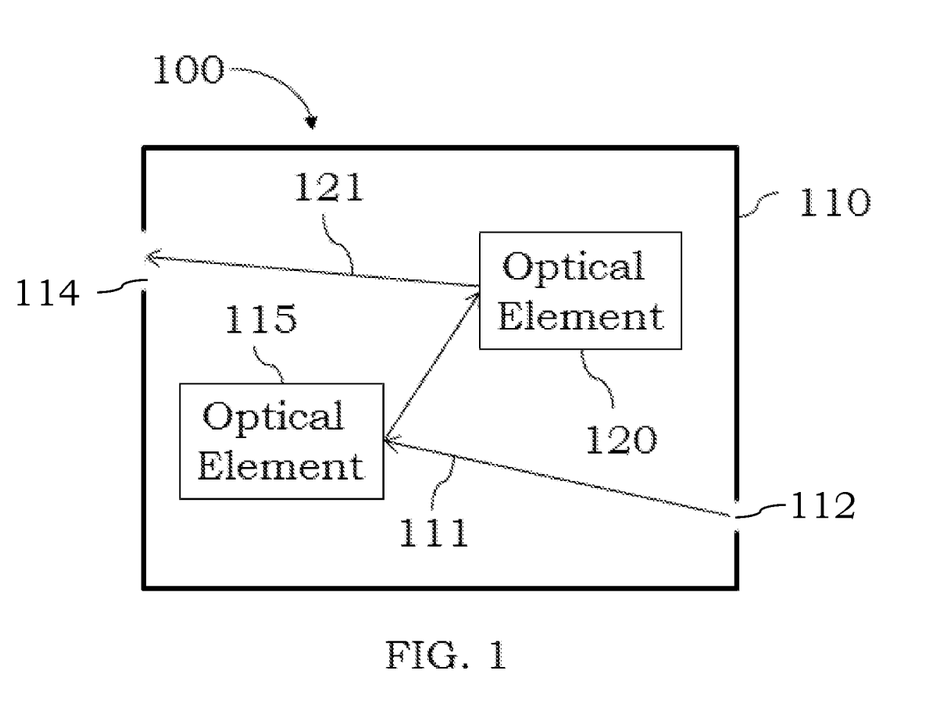
FIG. 1 is an illustration of an optical spectrometer, in accordance with certain examples.

In certain configurations and referring to FIG. 1, a general schematic of an optical spectrometer is shown. The optical spectrometer 100 comprises a housing 110 which includes two or more optical elements 115, 120 optically coupled to each other. The housing 110 comprises an entrance slit 112 and an exit slit 114. An optical input, e.g., light comprising a plurality of different wavelengths, may enter into the housing 110 through the entrance slit 112. The optical elements 115, 120 (and optionally other optical elements not shown) may perform one or more optical operations on the incident optical input 111 and provide a resulting optical output 121 through the exit slit 114. In a typical operation, incident light comprising a plurality of wavelength ranges varying from about 165 nm to about 950 nm, may be incident on the first optical element 115. The various optical elements within the housing 110 may separate the light into individual wavelengths so there is no or minimal spectral overlap in the wavelengths present in the incident light beam. Each separated wavelength of light may be incident on a detector (e.g., detector 540 shown in FIG. 5 below) that is optically coupled to the exit slit 114 of the spectrometer 100. As noted in more below, the detector may be selected such that simultaneous detection of all wavelengths present in the incident light beam are detected. If desired, both wavelength and intensity may be measured to permit quantitation of various analyte species that may emit light.

In various configurations described herein, the height and width of the entrance slit and the exit slit may vary and may be the same or may be different. In some examples, the slit height of each of the entrance slit and the exit slit may independently vary from about 50 microns to about 500 microns with slit heights around 350-400 microns being typically selected when wavelengths less than 200 nm are to be detected. The slit width of each of the entrance slit and the exit slit may independently vary from about 5 microns to about 50 microns with slit widths around 10-30 microns being typically used.

Figure 2:
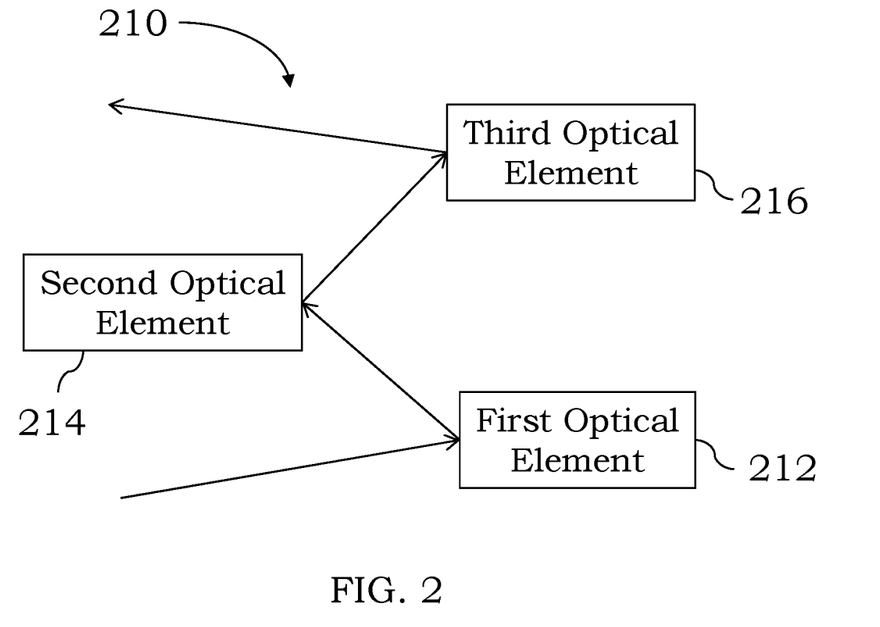
FIG. 2 is an illustration of certain components present in a reflective telescope, in accordance with certain configurations.

In certain instances, the spectrometer may comprise a reflective triplet telescope or imager. Referring to FIG. 2, a reflective triplet telescope or imager (collectively 210) is shown. While not wishing to be bound by any particular theory, the reflective triplet telescope 210 is configured to provide one or more wavelengths of light present in an incident light beam, e.g., present in a received light emission from one or more analyte species. The reflective triplet telescope is designed, at least in part, to spatially separate one or more wavelengths of light from other wavelengths of light to permit detection of each wavelength of light present in an incident light beam or optical input. For example, the spatially separated wavelengths of light may be provided to a two-dimensional detector to permit an image to be reconstructed using the values detected by the detector. In certain instances, the reflective triplet telescope 210 comprises a first optical element 212 optically coupled to a second optical element 214. The second optical element 216 is optically coupled to a third optical element 216. The exact positioning and angles of the optical elements 212, 214, and 216 may vary (as discussed in more detail below) depending on the exact configuration of each of the optical elements 212, 214 and 216. In some instances, one of the optical elements 212, 214 and 216 may be configured as a reflective optical element such as, for example, a mirror. In some instances, two of the optical elements 212, 214 and 216 may be configured as a reflective optical element such as, for example, a mirror, with the two reflective optical elements being the same or different as desired. In some instances, all three of the optical elements 212, 214 and 216 may be configured as a reflective optical element such as, for example, a mirror, with the three reflective optical elements being the same or different as desired.

In certain examples, the surfaces of each of the optical elements 212, 214, and 216 may take different forms and varying configurations including, but not limited to, aspherical surface shapes, rotationally symmetric, aspherical surface shapes, aspherical hyperboloid surface shapes, and/or convex aspherical ellipsoid surface shapes. While not wishing to be bound by any one configuration, the use of aspherical surfaces for one or more optical elements within the spectrometer may reduce the overall size of the spectrometer, reduce cost and may enhance its performance. Similarly, the exact curvature of the various optical elements 212, 214, 216 may vary. In some examples, the central optical element 214 may be a convex optical element and one or both of the optical elements 212, 216 may be concave optical elements. For example, the central optical element 214 may comprise a convex aspherical surface, and one or both of the optical elements 212, 216 may comprise concave aspherical surfaces. In certain specific configurations, the central optical element 214 of the reflective triplet telescope 200 may comprise a convex aspherical ellipsoid surface, and the optical elements 212, 216 may comprise concave aspherical hyperboloid surfaces which may be the same or may be different. Where the optical elements 212, 214, and 216 comprise rotationally symmetric, aspherical surfaces, the exact order of the aspherical surface may independently vary, e.g., 2nd order to 12th order with 12th order being selected in some instances for each of the optical elements 212, 214 and 216.

In certain examples, to determine the exact configuration of the primary mirror where a concave aspherical hyperboloid surface is present, Equation 1 may be used $$z = \frac{cr^2}{1 + \sqrt{1 - (1+k)c^2r^2}} + \sum_{i=1}^{N} (a_i r^i) \qquad (1)$$

where z is the surface sag, c is the curvature of the surface, r is the radius, $r^i$ is the radius to the $i^{th}$ power, k is the conic constant, and the a terms are the aspheric coefficients. The exact dimensions of the first optical element 212 may vary, for example, from about 140-180 mm in diameter. To determine the exact configuration of the secondary mirror where a convex aspherical ellipsoid surface is present, Equation 1 may be used. The exact dimensions of the second optical element 214 may vary, for example, from about 80-100 mm in diameter. To determine the exact configuration of the tertiary mirror where a concave aspherical hyperboloid surface is present, Equation 1 may be used. Illustrative dimensions for the third optical element 216 may vary from about 150-170 mm in height to about 150-170 mm in width.

In certain embodiments, one of the optical elements 212, 214 and 216 may comprise a surface shape other than an asymmetric surface shape. For example, in some instances, optical element 216 comprises a freeform surface shape, and optical elements 212, 214 comprise a surface shape other than a freeform surface shape. In other instances, optical element 216 comprises a freeform surface shape and one of the optical elements 212, 214 comprises a freeform surface shape and the other optical element 212, 214 comprises a surface shape other than a freeform surface shape. For example, one or two of the optical elements 212, 214 and 216 may comprise a freeform, rotationally nonsymmetric surface shape and one of the optical elements 212, 214 and 216 may comprise a surface shape other than a freeform, rotationally nonsymmetric surface shape. In some examples, the optical element 216 comprises a freeform, rotationally asymmetric surface shape, and the other two optical elements comprise a surface shape other than a freeform, rotationally nonsymmetric surface shape. Illustrative freeform, rotationally nonsymmetric surface shapes and other surface shapes are described, for example, in U.S. Pat. No. 8,616,712, US 20060268282 and U.S. Pat. No. 6,313,951, and hereby incorporated by reference.

In certain configurations, while three optical elements 212, 214 and 216 are shown as being present in the reflective triplet telescope 210, if desired, additional optical elements may also be present. For example, the reflective telescope may comprise four optical elements, optically coupled to each other, five optical elements optically coupled to each other or six optical element optically coupled to each other. Additional optical elements and components may be positioned between any one or more of the other optical elements if desired.

Figure 3A:
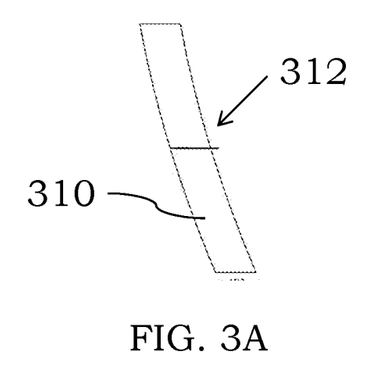
FIGS. 3A, 3B, 3C, 3D, 3E and 3F are illustrations of certain components that may be present in a reflective telescope of an optical spectrometer, in accordance with some examples.
Figure 3B:
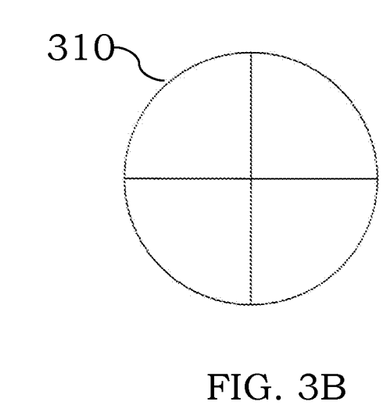

In certain instances, the first optical element of the reflective telescope may comprise an aspherical surface similar to that shown in FIGS. 3A (side view) and 3B (front view). The optical element 310 comprises a reflective surface 312 that may be used to perform an optical operation on incident light, e.g., reflect the light at a desired angle. The exact materials used to produce the optical element 310 may vary and illustrative materials include, but are not limited to, aluminum, borosilicate glass, zerodur, and 3D printable metals. The surface 312 may be polished, nickel plated and post polished, or otherwise processed as desired to provide a desirable shape and/or optical properties. In some examples, the surface 312 comprise a freeform surface, an aspherical surface, a symmetric surface or a nonsymmetric surface. The particular representation in FIG. 3A shows a concave aspherical hyperboloid surface, though as noted herein other surface shapes may be used instead.

Figure 3C:
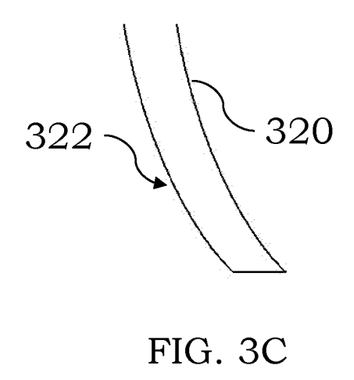
Figure 3D:
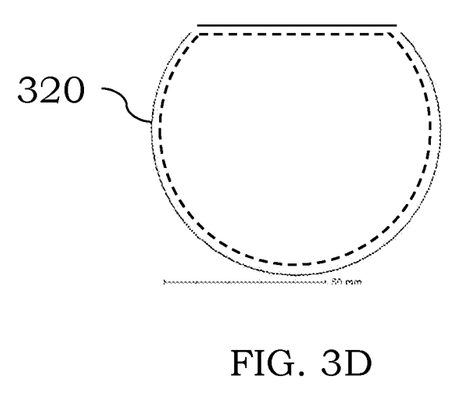

In certain configurations, the second optical element of the reflective telescope (positioned downstream of the first optical element 310) may comprise an aspherical surface similar to that shown in FIGS. 3C (side view) and 3D (front view). The second optical element 320 comprises a reflective surface 322 that may be used to perform an optical operation on incident light, e.g., reflect the light at a desired angle. The exact materials used to produce the optical element 320 may vary and illustrative materials include, but are not limited to, aluminum, borosilicate glass, zerodur, and 3D printable metals. The surface 322 may be polished, nickel plated and post polished, or otherwise processed as desired to provide a desirable shape and/or optical properties. In some examples, the surface 322 comprise a freeform surface, an aspherical surface, a symmetric surface or a nonsymmetric surface. The particular representation in FIG. 3C shows a convex aspherical ellipsoid surface, though as noted herein other surface shapes may be used instead.

Figure 3E:
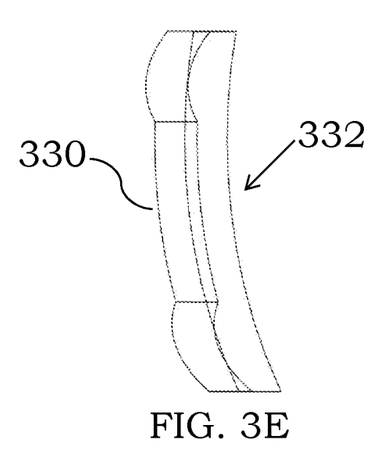
Figure 3F:
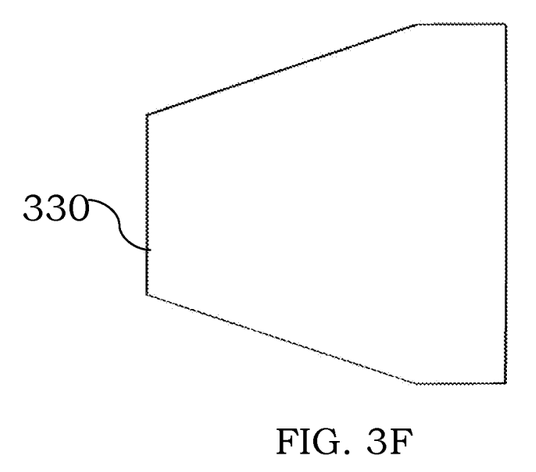

In certain configurations, the third optical element of the reflective telescope (positioned downstream of the second optical element 320) may comprise an aspherical surface similar to that shown in FIGS. 3E (side view) and 3F (front view). The third optical element 330 comprises a reflective surface 332 that may be used to perform an optical operation on incident light, e.g., reflect the light at a desired angle. The exact materials used to produce the optical element 330 may vary and illustrative materials include, but are not limited to, aluminum, borosilicate glass, zerodur, and 3D printable metals. The surface 332 may be polished, nickel plated and post polished, or otherwise processed as desired to provide a desirable shape and/or optical properties. In some examples, the surface 332 comprise a freeform surface, an aspherical surface, a symmetric surface or a nonsymmetric surface. The particular representation in FIG. 3E shows a concave aspherical hyperboloid surface, though as noted herein other surface shapes may be used instead. While not shown, the third optical element 330 is typically optically coupled to a downstream detector to provide light from the optical spectrometer to the detector.

Figure 4:
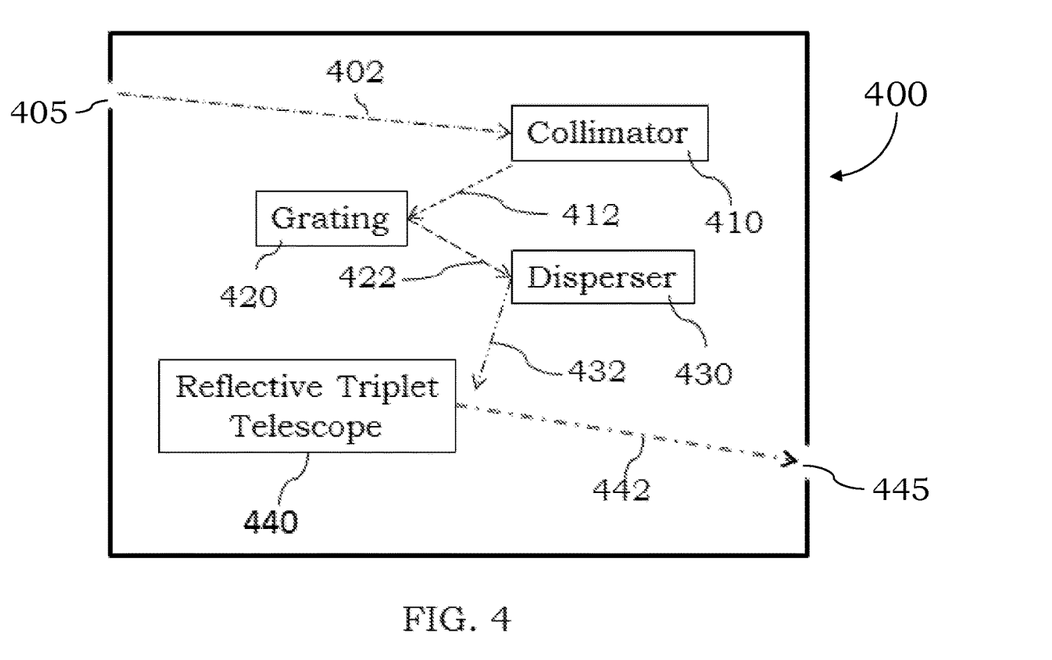
FIG. 4 is an illustration of an optical spectrometer, in accordance with some embodiments.

In certain configurations, additional optical elements may be used in combination with the optical elements present in a reflective triplet telescope. Referring to FIG. 4, a block diagram of certain optical elements present in a spectrometer are shown. The spectrometer 400 comprises an entrance slit 405 optically coupled to a collimator 410. The collimator 410 is optically coupled to a grating 420. The grating 420 is optically coupled to a disperser 430. The disperser is optically coupled to a reflective triplet telescope 440. The reflective triplet telescope 440 may be optically coupled to an inlet of a detector (or an optional exit slit 445) if desired to provide an optical output from the spectrometer 400 to a downstream detector. Each of these components is considered in more detail below.

In certain examples, the collimator 410 present in the spectrometer 400 is configured to narrow the incident optical input 402, e.g., an incident light beam, received through the entrance slit 405. For example, as light enters into the spectrometer 400 through the entrance slit 405, the light is traveling in different directions or angles relative to the incident surface of the collimator 410. The collimator 410 may effectively convert diverging light into parallel light beams. The collimator 410 may be designed to provide an optical output (e.g., light 412) such that the light provided by the collimator 410 is generally parallel or aligned or becomes focused at a desired distance from the collimator 410. While the exact configuration of the collimator 410 may vary, in some instances, the collimator may take the form of a parabola such as an off-axis parabola. For example, an off-axis parabola may focus incident light to a downstream component. Depending on the distance and angle between the collimator 410 and the downstream component, the exact f-number (f #) and off-axis angle selected for the collimator may vary, e.g., the f # may vary from one to ten or two to eight or be two, three or four or any number between these values. The off-axis angle of the collimator 410 typically is less than 30 degrees, e.g., 20 degrees or less or 15 degrees or less. The focal length of the collimator 410 may vary from about 200 mm to about 1500 mm with values in the 250-300 mm range being typical for the optical spectrometers described herein.

In certain embodiments, the light 412 provided from the collimator 410 may be provided to the grating 420. While the exact grating used may vary, the grating typically is an Echelle grating. Without wishing to be bound by any particular configuration, an Echelle grating comprises a low groove density but a groove shape configured for use at high incidence angles. Higher diffraction orders may be obtained using an Echelle grating in combination with the other components to provide for increased spatial separation of different wavelengths of light. In a typical Echelle grating, a plurality of slits are present with widths about the same as the wavelength of the diffracted light. With reflective gratings, the reflective portion may be tilted (blazed) to scatter a majority of the light into a desired direction of interest (and into a specific diffraction order). For multiple wavelengths of light, the same general result occurs, but it is possible for longer wavelengths of a higher order to overlap with the next order(s) of a shorter wavelength. In an Echelle grating, this behavior is deliberately selected and the blaze is optimized for multiple overlapping higher orders. The resulting optical output from the Echelle grating comprises stripes with different, but overlapping, wavelength ranges. The downstream optical elements may be used to provide spatial separation in a direction perpendicular to the Echelle grating's diffraction plane to permit detection of each wavelength of light present in an incident optical input received by the spectrometer. The exact blaze angle used may depend on the system level specifications of the spectrometer, and illustrative blaze angles include but are not limited to about 40 degrees to about 90 degrees, e.g., about 60 degrees to about 65 degrees. The groove density present on the grating 420 may also vary from about 10 lines per mm to about 100 lines per mm with values in the 75-85 lines per mm being typically used in the spectrometers described herein.

In certain examples, the optical output 422 provided from the grating 420 may be provided to a downstream optical disperser 430 to further disperse or spatially separate the wavelengths of light. If desired, the disperser 430 could instead be positioned upstream of the grating 420, e.g., between the collimator 410 and the grating 420, to function as a pre-disperser. In other instances a first disperser may be positioned between the collimator 410 and the grating 420 and a second disperser may be downstream of the grating 420. The disperser 430 may be configured to provide an optical output 432, e.g., cross-dispersed light, to a downstream optical component, e.g., to the first optical element of the reflective triplet telescope. While the exact configurations of the disperser 430 may vary, illustrative configurations include, but are not limited to, a refractive prism, a double-pass reflective prism, a double-pass refractive prism, a reflective grating, a refractive grating, a grisms, a double-pass reflective grism or other optical elements. Notwithstanding that many different optical elements may be used for the disperser 430, the disperser 430 generally provides an optical output comprising cross-dispersed light to the first optical element of the reflective triplet telescope 440. The optical output angle of light provided from the disperser 430 may be orthogonal, nearly orthogonal or less than orthogonal, to the angle of light incident on the disperser 430, e.g., the angle between incident light and provided light may be between about 0 degrees and about 180 degrees. The reflective triplet telescope 440 may be configured similar to those illustrations described herein. The reflective triplet telescope 440 provides an optical output 442 through an exit slit 445 and to a detector (not shown) optically coupled to the optical spectrometer 400.

Figure 5:
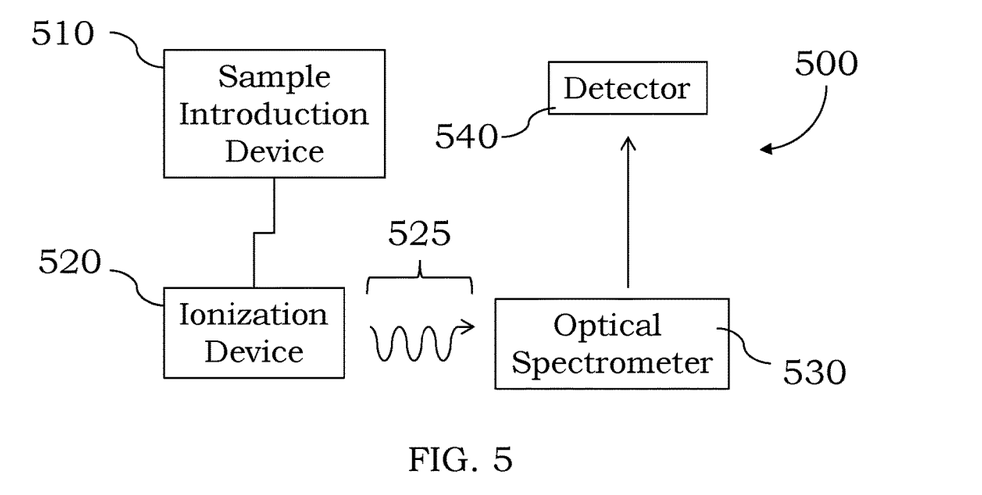
FIG. 5 is an illustration of an optical emission instrument, in accordance with certain embodiments.
Figure 6:
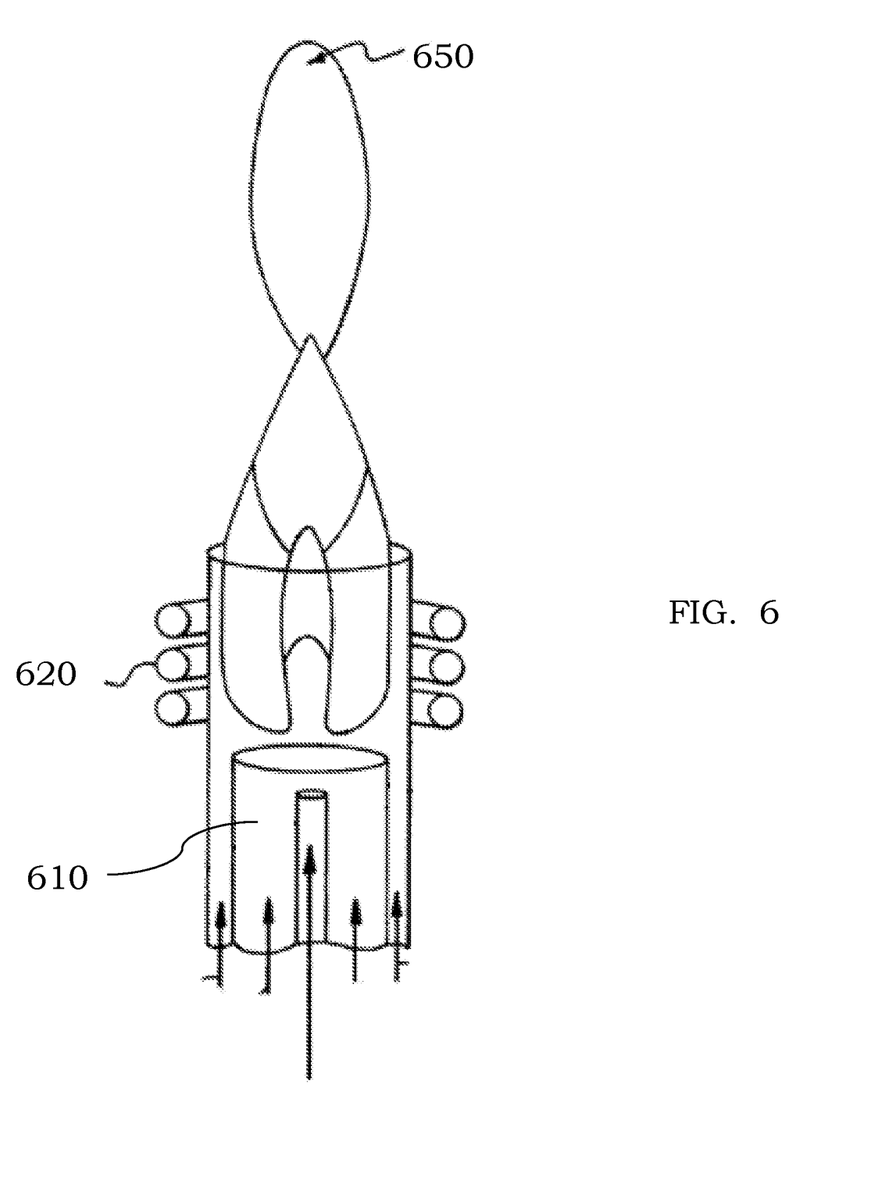
FIG. 6 is an illustration of an inductively coupled plasma, in accordance with some examples.
Figure 7:
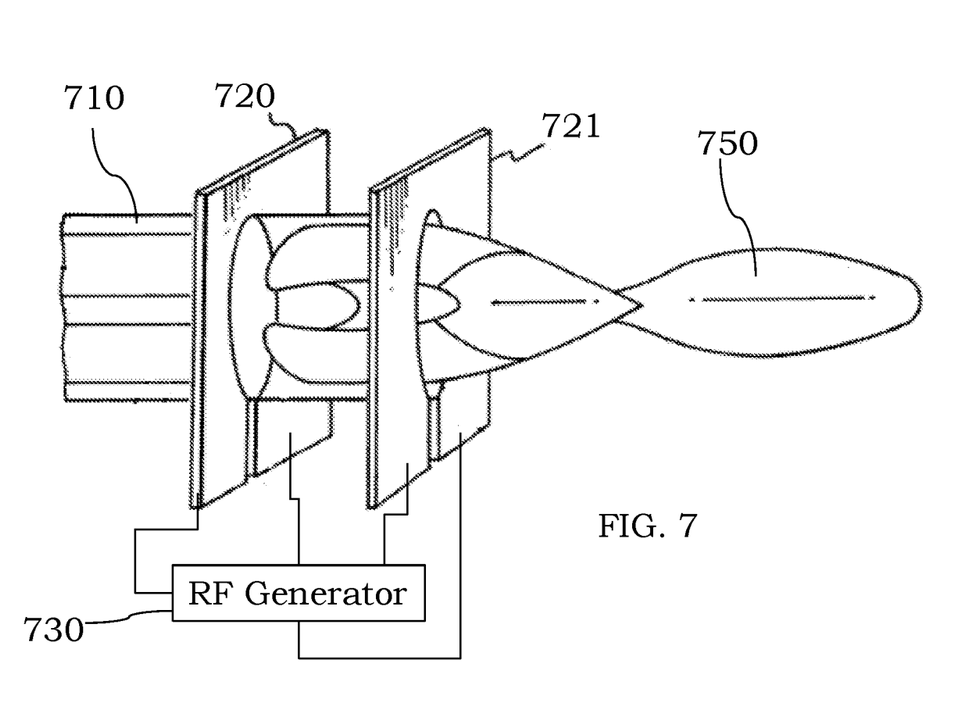
FIG. 7 is another illustration of an inductively coupled plasma, in accordance with some examples.
Figure 8:
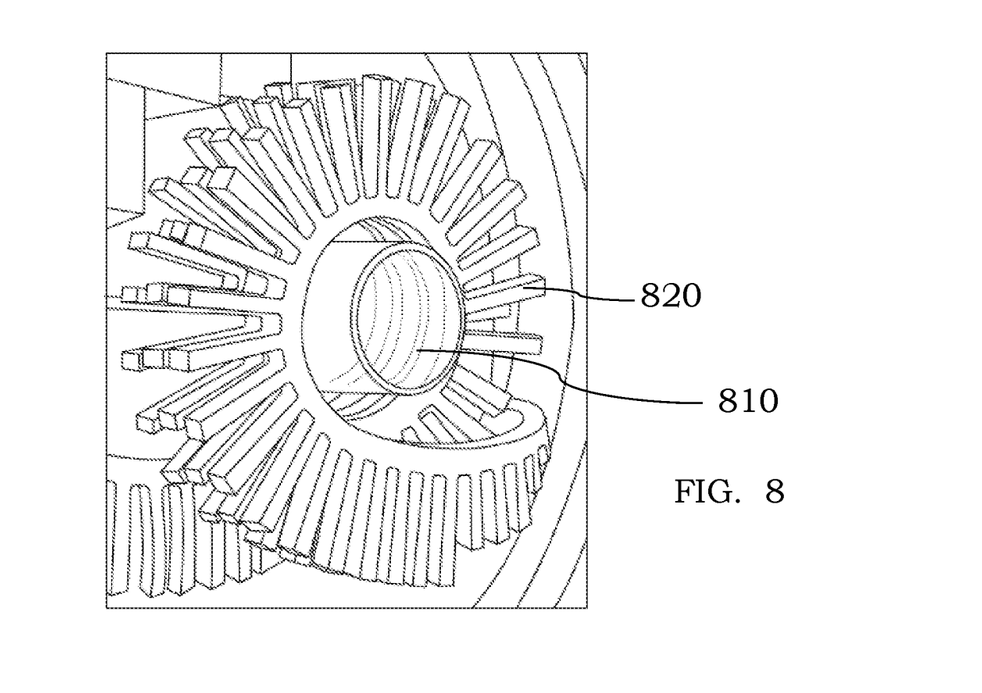
FIG. 8 is an illustration of an induction device comprising radial fins, in accordance with some instances.

In certain examples, the optical spectrometers described herein may be used in an optical emission instrument. A block diagram of certain components of an optical emission (OES) instrument is shown in FIG. 5. The OES device 500 comprises a sample introduction device 510, an ionization device 520, an optical spectrometer 530 and a detector or detection device 540. The sample introduction device 510 may take many forms such as injectors, capillary tubing, a nebulizer to aerosolize liquid sample for introduction into the ionization device 520, etc. Where a nebulizer is used, the nebulizer may take many forms including crossflow nebulizers, concentric nebulizers and microflow nebulizers. Where injectors are used, the injector may take the form of a needle, capillary or other tubing with a small orifice. Additional sample introduction devices will be selected by the person of ordinary skill in the art, given the benefit of this disclosure. For example, ultrasonic pulse liquid delivery devices, droplet generators or microdrop generators may also be used as or with sample introduction devices. In addition, the nebulizer (or other sample introduction device) may be hyphenated to one or more upstream devices or instruments, e.g., liquid chromatography devices, capillary electrophoresis devices, cell sorters, cell handling apparatus, and the like. The ionization device 520 may comprise one or more components as illustrated in FIGS. 6-8 or other devices and components which may provide or sustain an ionization source. The detector or detection device 540 may take numerous forms and may be any suitable device that may detect optical emissions, such as optical emission 525. For example, the detector 540 may include suitable optics, such as lenses, mirrors, prisms, windows, band-pass filters, etc.

The detector 540 may also be configured as a camera such as a charge couple device (CCD) camera, a complementary metal-oxide-semiconductor (CMOS) detector or other types of detectors. The detector 540 may be configured to detect emission wavelengths over a large wavelength range including, but not limited to, ultraviolet, visible, near and far infrared, etc. As noted herein, the detector may be used to provide a two-dimensional image representative of the various emitted wavelengths. The OES device 500 may further include suitable electronics such as a microprocessor and/or computer and suitable circuitry to provide a desired signal and/or for data acquisition. Suitable additional devices and circuitry are known in the art and may be found, for example, on commercially available OES devices such as Optima 2100DV series, Optima 5000 DV series OES devices, Optima 8000, or 8300 series OES devices, or Avio 200 and Avio 500 OES devices commercially available from PerkinElmer Health Sciences, Inc. The optical spectrometer 530 may be configured as any of the optical spectrometers described herein. It will also be within the ability of the person of ordinary skill in the art, given the benefit of this disclosure, to retrofit existing OES devices with the optical spectrometers disclosed herein and to design new OES devices using the spray chambers disclosed here. The OES devices may further include autosamplers, such as AS90 and AS93 autosamplers commercially available from PerkinElmer Health Sciences, Inc. or similar devices available from other suppliers.

In certain embodiments, the exact nature of the ionization device 520 may vary, and illustrative types of ionization devices 520 include, but are not limited to, inductively coupled plasmas, capacitively coupled plasmas, microwave-induced plasmas, low flow plasmas, arcs, sparks, flames and other high temperature or high energy sources which may ionize and/or atomize a sample, e.g., a sample comprising an inorganic material or an organic material. In certain examples, the ionization device 520 may comprise one or more torches and one or more induction devices. Certain components of an ionization device are shown in FIGS. 6-8. Illustrative induction devices and torches are described, for example, in U.S. Pat. Nos. 9,433,073 and 9,360,403, the entire disclosure of which is hereby incorporated herein by reference for all purposes. Referring to FIG. 6, a device comprising a torch 610 in combination with an induction device or induction coil 620 is shown. The induction coil 620 is typically electrically coupled to a radio frequency generator (not shown) to provide radio frequency energy into the torch 610 and sustain an inductively coupled plasma 650. The sample introduction device aerosolizes the sample and provides it to the plasma 650. Metal species in the sample may be ionized or atomized and excited by the plasma 650, and light emissions from the excited species may be separated using an optical spectrometer as described herein and then detected using a detector.

In an alternative configuration, the induction coil 620 could be replaced with one or more plate electrodes. For example and referring to FIG. 7, a first plate electrode 720 and a second plate electrode 721 are shown as comprising an aperture that may receive a torch 710. For example, the torch 710 may be placed within some region of an induction device comprising plate electrodes 720, 721. A plasma or other ionization/atomization source 750 such as, for example, an inductively coupled plasma may be sustained using the torch 710 and inductive energy from the plate electrodes 720, 721. A radio frequency generator 730 is shown as electrically coupled to each of the plate electrodes 720, 721. If desired, only a single plate electrode could be used instead. In a typical configuration, a nebulizer is fluidically coupled to the torch 710 to provide liquid into the plasma 750. Metal species in the sample may be ionized or atomized and excited by the plasma 750, and light emissions from the excited species may be separated using an optical spectrometer as described herein and then detected using a detector.

In other configurations, an induction device comprising one or more radial fins could instead be used in combination with the optical spectrometers described herein. Referring to FIG. 8, a device or system may comprise an induction coil 820 comprising at least one radial fin and a torch 810. A plasma or other ionization/atomization source (not shown) such as, for example, an inductively coupled plasma may be sustained using the torch 810 and inductive energy from the radially finned induction device 820. A radio frequency generator (not shown) may be electrically coupled to the induction coil 820 to provide radio frequency energy into the torch 810. A sample introduction device may aerosolize the sample and provides it to the plasma. Metal species in the sample may be ionized or atomized and excited by the plasma, and light emissions from the excited species may be separated using an optical spectrometer as described herein and then detected using a detector.

In other instances, one or more capacitive devices such as, for example, capacitive coils or capacitive plates may be used in combination with the optical spectrometers described herein. Further two or more induction devices, capacitive devices or other devices which may provide energy into the torch to sustain an atomization/ionization source such as a plasma or flame may also be used in combination with the optical spectrometers described herein.

Figure 9:
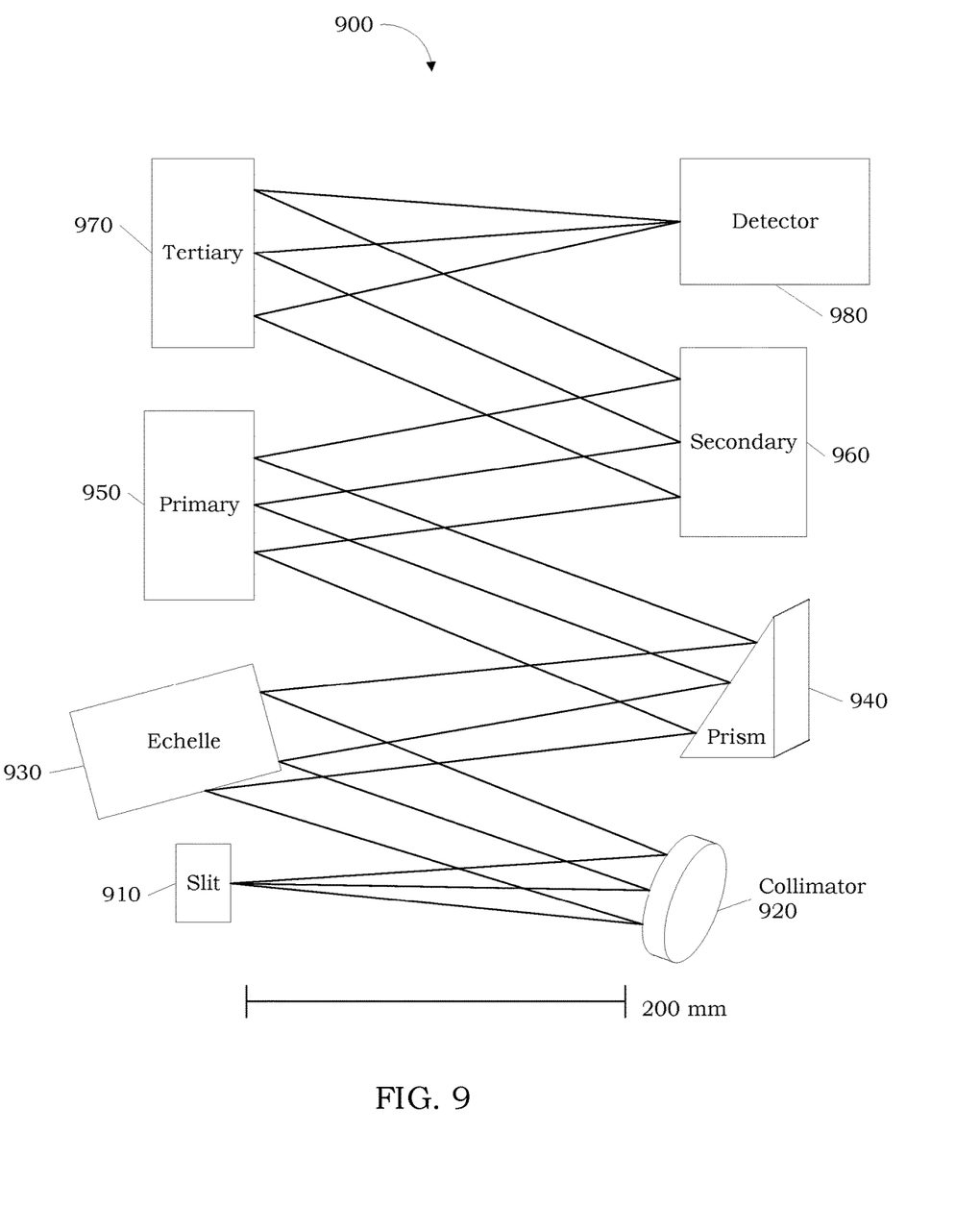
FIG. 9 is an illustration of an optical spectrometer, in accordance with certain instances.

In certain examples, the optical spectrometer 530 may take many different configurations and one illustration is shown in FIG. 9. An optical spectrometer 900 comprises an entrance list 910, a collimator 920, an Echelle grating 930, a cross-disperser 940, a primary optical element 950 of a reflective telescope, a secondary optical element 960 of the reflective telescope, a tertiary optical element 970 of the reflective telescope and a detector 980. If desired, the cross-disperser 940 could instead be positioned between the collimator 920 and the Echelle grating 930 as a pre-disperser. As noted herein, the optical spectrometer 900 may be configured to spatially separate wavelengths of light in an optical input, e.g., wavelengths of light present in incident optical emissions from analyte species in a torch, and provide an optical output for detection. In some examples, the optical output may be imaged, e.g., as a two-dimensional representation, and used to determine an amount of each of the analyte species present in a sample.

In certain examples, the instruments described herein may comprise or use a processor, which may be part of the instrument or present in an associated device, e.g., computer, laptop, mobile device, etc. used with the instrument. For example, the processor may be used to provide or construct an image representative of the various analyte optical emissions received by a detector. Such processes may be performed automatically by the processor without the need for user intervention. For example, the processor may use signal intensities along with one or more calibration curves to determine how much of each analyte is present in the sample. In certain configurations, the processor may be present in one or more computer systems and/or common hardware circuitry including, for example, a microprocessor and/or suitable software for operating the system, e.g., to control the ionization device, detector, etc. In some examples, the detector itself may comprise its own respective processor, operating system and other features to permit detection of various analyte species. The processor may be integral to the systems or may be present on one or more accessory boards, printed circuit boards or computers electrically coupled to the components of the system. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. It should be appreciated that other functions, including network communication, may be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, calibration curves, and data values during operation of the OES instrument. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically may receive and/or issue commands within a processing time, e.g., a few milliseconds, a few microseconds or less, to permit rapid control of the system. For example, computer control may be implemented to control sample introduction, detector parameters, etc. The processor typically is electrically coupled to a power source which can, for example, be a direct current source, an alternating current source, a battery, a fuel cell or other power sources or combinations of power sources. The power source may be shared by the other components of the system. The system may also include one or more input devices, for example, a keyboard, mouse, trackball, microphone, touch screen, manual switch (e.g., override switch) and one or more output devices, for example, a printing device, display screen, speaker. In addition, the system may contain one or more communication interfaces that connect the computer system to a communication network (in addition or as an alternative to the interconnection device). The system may also include suitable circuitry to convert signals received from the various electrical devices present in the systems. Such circuitry may be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, Wi-Fi, Near Field Communication or other wireless protocols and/or interfaces.

In certain embodiments, the storage system used in the systems described herein typically includes a computer readable and writeable nonvolatile recording medium in which codes of software may be stored that may be used by a program to be executed by the processor or information stored on or in the medium to be processed by the program. The medium may, for example, be a hard disk, solid state drive or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware. In the systems, the processor is typically a commercially available processor such as the well-known Pentium class processors available from the Intel Corporation. Many other processors are also commercially available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software may be configured to implement cognitive architecture, neural networks or other suitable implementations. If desired, one or more portions of the computer system may be distributed across-one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which may communicate through a wired or wireless interface and permit operation of the systems remotely as desired.

In certain examples, the processor may also comprise or have access to a database of information about analyte species and the like, which may include optical emission wavelengths and other common information. For example, a collection of calibration curves for different analytes may be stored in the database and used to estimate analyte concentrations in the sample without the need for the user to perform calibration curves for each of the analytes. Such methods may be particularly desirable where the amount of sample is limited. The instructions stored in the memory may execute a software module or control routine for the system, which in effect may provide a controllable model of the system. The processor may use information accessed from the database together with one or software modules executed in the processor to determine control parameters or values for different components. Using input interfaces to receive control instructions and output interfaces linked to different system components in the spectrometer system, the processor may perform active control over the system. For example, the processor may control the detector, sample introduction devices, ionization devices, entrance and exit slit width, detectors, etc.

In some examples, the optical spectrometers described herein may be used in methods of detecting simultaneous optical emissions of analyte species in an ionization device. Quantitation of each of the analyte species in a sample introduced into the ionization device may be performed if desired. In some instances, the method comprises separating each emitted wavelength in the simultaneous optical emissions to permit detection of each analyte species over wavelength range of about 165 nm to about 900 nm and optionally to permit quantitation of an amount of each analyte species. As noted herein, the method may use an optical comprising a collimator, an Echelle grating optically coupled to the collimator and configured to receive collimated light from the collimator and disperse the received collimated light, an optical disperser optically coupled to the Echelle grating and configured to receive the dispersed light from the Echelle grating and provide cross-dispersed light, and a reflective triplet telescope optically coupled to the optical disperser and configured to receive the cross-dispersed light from the optical disperser, wherein the reflective triplet telescope comprises a plurality of independent and separate rotationally symmetric, aspherical surfaces, wherein the reflective triplet telescope is configured to provide one or more wavelengths of light in the provided optical emissions from the analyte species, wherein each wavelength of light provided by the reflective triplet telescope is spatially separated from other provided wavelengths of light to permit detection of each provided wavelength of light. The reflective telescope or imager may be configured in many different ways as noted herein, e.g., may comprise a primary mirror optically coupled to the double-pass optical disperser, a secondary mirror optically coupled to the primary mirror, and a tertiary mirror optically coupled to the secondary mirror.

In some instances, the method comprises configuring one or more or each of the primary mirror, the secondary mirror and the tertiary mirror to comprise rotationally symmetric, aspherical surfaces. In other examples, the method comprises configuring the primary mirror to comprise a concave aspherical hyperboloid surface, configuring the secondary mirror to comprise a convex aspherical ellipsoid surface, and configuring the tertiary mirror to comprise a concave aspherical hyperboloid surface. In some examples, the spectral resolution of the optical spectrometer may be at least 0.01 nm, e.g., may be about 0.006 nm at 220 nm. In certain instances, the method comprises configuring one or more of the rotationally symmetric, aspherical surfaces to be $6^{th}$ order, $8^{th}$ order, $10^{th}$ order or higher rotationally symmetric, aspherical surfaces, e.g., to each be $12^{th}$ order rotationally symmetric, aspherical surfaces. In certain instances, the method comprises configuring one of the primary mirror, the secondary mirror and the tertiary mirror to comprise a freeform, rotationally nonsymmetric surface shape. In other instances, the method comprises comprising configuring one of the primary mirror, the secondary mirror and the tertiary mirror to comprise an aspherical surface shape. In some examples, the method comprises configuring the tertiary mirror to comprise the freeform, rotationally nonsymmetric surface shape.

Certain specific examples are described to further illustrate some of the aspects and features of the technology described herein.

Example 1

A first optical element of a reflective triplet telescope may be produced using aluminum. The first optical element may be constructed similar to the optical element shown in FIGS. 3A and 3B. Using equation (1), the values for the first optical element may be obtained. The resulting surface may be a concave aspherical hyperboloid surface.

Example 2

A second optical element of a reflective triplet telescope may be produced using aluminum. The second optical element may be constructed similar to the optical element shown in FIGS. 3C and 3D. Using equation (1), the values for the second optical element may be obtained. The resulting surface may be a concave aspherical ellipsoid surface.

Example 3

A third optical element of a reflective triplet telescope may be produced using aluminum. The third optical element may be constructed similar to the optical element shown in FIGS. 3E and 3F. Using equation (1), the values for the third optical element may be obtained. The resulting surface may be a concave aspherical ellipsoid surface.

Example 4

An Echelle grating may be selected based on desired spatial separation of incident light. Various parameters that may be used in design of the Echelle grating include the minimum wavelength (e.g., 167 nm), the maximum wavelength (e.g., >750 nm), a bandwidth, spectral resolution, and bandwidth in wave number. These parameters are for illustrative purposes only. Other design parameters are possible and not limited to the above.

Information may be used to determine the Echelle grating may include image plane information, Echellogram height and width at maximum wavelength, order separation, pixel size, and slit width.

Based on these and other design parameters, the spectral resolution may be estimated.

The geometry of the Echelle grating and other components may then be selected. For example, the first and second optical elements may be designed such that each has a field-of-view of 6.187547288 degrees. The third optical element may then be designed such that it has a field-of-view of 8.716809692 degrees.

The spectral resolution of the optical spectrometer may then be ascertained using selected geometrical parameters.

For instance, a spectral slit width may be calculated by dividing the wavelength by two times the tangent of the blaze angle times the slit width dividing by the collimator focal length. Also, a spectral pixel width may be obtained by dividing the wavelength by two times the tangent of the blaze angle times the pixel size dividing by the telescope's focal length.

Example 5

Various simulations may be performed to estimate the performance characteristics of an optical spectrometer similar to that shown in FIG. 9 with the optical elements of Examples 1-3. Comparisons may be made between optical spectrometers having optical elements with parabolic, aspheric, and spherical surfaces. The various optical values may be estimated or obtained in "high resolution" and "low resolution" configurations. A grism or prism may be present in the optical spectrometer between the Echelle grating and the first optical element of the reflective telescope and is used as a cross-dispersing element.

It is estimated that increased throughput may be obtained relative to conventional designs. In particular, a 40× increase in throughput is estimated to be obtained compared to one design with 6× better detection limits. A 12.5× increase in throughput is estimated to be obtained compared to another design with 3-4× better detection limits.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples may be interchanged or substituted with various components in other examples.

Although certain aspects, configurations, examples and embodiments have been described above, it will be recognized by the person of ordinary skill in the art, given the benefit of this disclosure, that additions, substitutions, modifications, and alterations of the disclosed illustrative aspects, configurations, examples and embodiments are possible.

What is claimed is:

1. An optical spectrometer comprising:
   an entrance slit configured to receive light;
   a collimator optically coupled to the entrance slit;
   an Echelle grating optically coupled to the collimator and configured to receive collimated light from the collimator and disperse the received collimated light;
   a double-pass optical disperser optically coupled to the Echelle grating and configured to receive the dispersed light from the Echelle grating and provide cross-dispersed light,
   wherein the cross-dispersed light comprises one or more wavelengths from the light received at the entrance slit;
   a reflective telescope optically coupled to the double-pass optical disperser and configured to receive the cross-dispersed light from the double-pass optical disperser; and
   a detector positioned to receive the cross-dispersed light from the reflective telescope,
      wherein the reflective telescope is configured to provide one or more wavelengths of light to the detector,
      wherein each of the one or more wavelengths of light provided by the reflective telescope is spatially separated from other provided wavelengths of light to permit detection of each provided wavelength of light by the detector,
      wherein the reflective telescope comprises a primary mirror optically coupled to the double-pass optical disperser, a secondary mirror optically coupled to the primary mirror, and a tertiary mirror optically coupled to the secondary mirror,
      wherein the tertiary mirror comprises a concave, aspherical, hyperboloid surface, and
      wherein the tertiary mirror reflects the one or more wavelengths of spatially separated light onto the detector.

2. The optical spectrometer according to claim 1, wherein the detector is configured to receive light within a wavelength range of about 165 nm to about 900 nm.

3. The optical spectrometer according to claim 1, wherein the collimator comprises an off-axis parabola surface having an off-axis angle.

4. The optical spectrometer according to claim 3, wherein an f # of the collimator is 3 and the off-axis angle of the collimator is 14 degrees.

5. The optical spectrometer according to claim 1, wherein the double-pass optical disperser comprises one of a grism or a double-pass reflective grism.

6. The optical spectrometer according to claim 1, wherein the double-pass optical disperser comprises one of a reflective grating or a refractive grating.

7. The optical spectrometer according to claim 1, wherein a focal length of the collimator is about 255 mm.

8. The optical spectrometer according to claim 1, wherein the Echelle grating comprises a blaze angle of 62 degrees and a groove density of 79 lines per mm.

9. The optical spectrometer according to claim 1, wherein a spectral resolution of the optical spectrometer is about 0.006 nm at 220 nm.

10. The optical spectrometer according to claim 1, wherein each of the primary mirror, the secondary mirror and the tertiary mirror comprises a rotationally symmetric, aspherical surface, and
   wherein the rotationally symmetric, aspherical surfaces are 12th order rotationally symmetric, aspherical surfaces.

11. The optical spectrometer according to claim 1, wherein one of the primary mirror, the secondary mirror, or the tertiary mirror comprises a freeform, rotationally nonsymmetric surface shape.

12. The optical spectrometer according to claim 1, wherein the primary mirror comprises a concave, aspherical, hyperboloid surface,
   wherein the secondary mirror comprises a convex, aspherical, ellipsoid surface.

13. The optical spectrometer according to claim 1, wherein the double-pass optical disperser comprises a refractive prism.

14. The optical spectrometer according to claim 1, wherein the field-of-view of the primary mirror is about 6.2 degrees, the field-of-view of the secondary mirror is about 6.2 degrees, and the field-of-view of the tertiary mirror is about 8.7 degrees.

15. The optical spectrometer according to claim 1, wherein the primary mirror and secondary mirrors have a first field-of-view; and
   wherein the tertiary mirror has a second field-of-view different from the first field of view.

16. An inductively coupled plasma optical emission instrument comprising:
   a sample introduction device;
   a torch fluidically coupled to the sample introduction device;
   an induction device configured to provide radio frequency energy into the torch to sustain an inductively coupled plasma in the torch;
   an optical spectrometer comprising:
      an entrance slit configured to receive light from a sample subjected to the inductively coupled plasma;
      a collimator optically coupled to the entrance slit;
      an Echelle grating optically coupled to the collimator and configured to receive collimated light from the collimator and disperse the received collimated light;
      a double-pass optical disperser optically coupled to the Echelle grating and configured
         to receive the dispersed light from the Echelle grating and
         to provide cross-dispersed light, wherein the cross-dispersed light comprises one or more wavelengths from the light received at the entrance slit;
      a reflective telescope optically coupled to the double-pass optical disperser and configured to receive the cross-dispersed light from the double-pass optical disperser; and
      a detector positioned to receive the cross-dispersed light from the reflective telescope,
         wherein the reflective telescope is configured to provide one or more wavelengths of light to the detector,
         wherein each of the one or more wavelengths of light is spatially separated from other provided wavelengths of light to permit detection of each provided wavelength of light by the detector, wherein the reflective telescope comprises a primary mirror optically coupled to the double-pass optical disperser, a secondary mirror optically coupled to the primary mirror, and a tertiary mirror optically coupled to the secondary mirror, and wherein the tertiary mirror comprises a concave, aspherical, hyperboloid surface that reflects the one or more wavelengths of spatially separated light onto the detector.

17. The inductively coupled plasma optical emission instrument according to claim 16, wherein one of the primary mirror, the secondary mirror, or the tertiary mirror comprises a freeform, rotationally nonsymmetric surface shape.

18. The inductively coupled plasma optical emission instrument according to claim 16, wherein the collimator comprises an off-axis parabola surface.

19. The inductively coupled plasma optical emission instrument according to claim 16, wherein the double-pass optical disperser comprises one of a grism or a double-pass reflective grism.

20. The inductively coupled plasma optical emission instrument according to claim 16, wherein the double-pass optical disperser comprises one of a reflective grating or a refractive grating.

21. The inductively coupled plasma optical emission instrument according to claim 16, wherein the primary mirror comprises a concave, aspherical, hyperboloid surface, wherein the secondary mirror comprises a convex, aspherical, ellipsoid surface.

22. The inductively coupled plasma optical emission instrument according to claim 16, wherein the double-pass optical disperser comprises a refractive prism.

23. The inductively coupled plasma optical emission instrument according to claim 16, wherein the field-of-view of the primary mirror is about 6.2 degrees, the field-of-view of the secondary mirror is about 6.2 degrees, and the field-of-view of the tertiary mirror is about 8.7 degrees.

24. The inductively coupled plasma optical emission instrument according to claim 16, wherein the primary mirror and secondary mirrors have a first field-of-view; and wherein the tertiary mirror has a second field-of-view different from the first field of view.

25. An inductively coupled plasma optical emission instrument comprising:

a sample introduction device;

a torch fluidically coupled to the sample introduction device;

an induction device configured to provide radio frequency energy into the torch to sustain an inductively coupled plasma in the torch;

an optical spectrometer comprising:

an entrance slit configured to receive light from a sample subjected to the inductively coupled plasma;

a collimator optically coupled to the entrance slit;

an Echelle grating optically coupled to the collimator and configured to receive collimated light from the collimator and disperse the received collimated light;

a double-pass optical disperser optically coupled to the Echelle grating and configured to receive the dispersed light from the Echelle grating and to provide cross-dispersed light, wherein the cross-dispersed light comprises one or more wavelengths from the light received at the entrance slit;

a reflective telescope optically coupled to the double-pass optical disperser and configured to receive the cross-dispersed light from the double-pass optical disperser, said reflective telescope consisting of a primary mirror optically coupled to the double-pass optical disperser, a secondary mirror optically coupled to the primary mirror, and a tertiary mirror optically coupled to the secondary mirror; and a detector positioned to receive the cross-dispersed light from the reflective telescope, wherein the reflective telescope is configured to provide one or more wavelengths of light to the detector, wherein each of the one or more wavelengths of light is spatially separated from other provided wavelengths of light to permit detection of each provided wavelength of light by the detector, wherein the tertiary mirror comprises a concave, aspherical, hyperboloid surface that reflects the one or more wavelengths of spatially separated light onto the detector.

26. The inductively coupled plasma optical emission instrument according to claim 25, wherein the field-of-view of the primary mirror is about 6.2 degrees, the field-of-view of the secondary mirror is about 6.2 degrees, and the field-of-view of the tertiary mirror is about 8.7 degrees.

27. The inductively coupled plasma optical emission instrument according to claim 25, wherein the primary mirror and secondary mirrors have a first field-of-view; and wherein the tertiary mirror has a second field-of-view different from the first field of view.

* * * * *